Oct. 29, 1968
J. S. CHANDLER ETAL
3,408,132
PROJECTION SCREEN
Filed Nov. 21, 1966
7 Sheets-Sheet 1
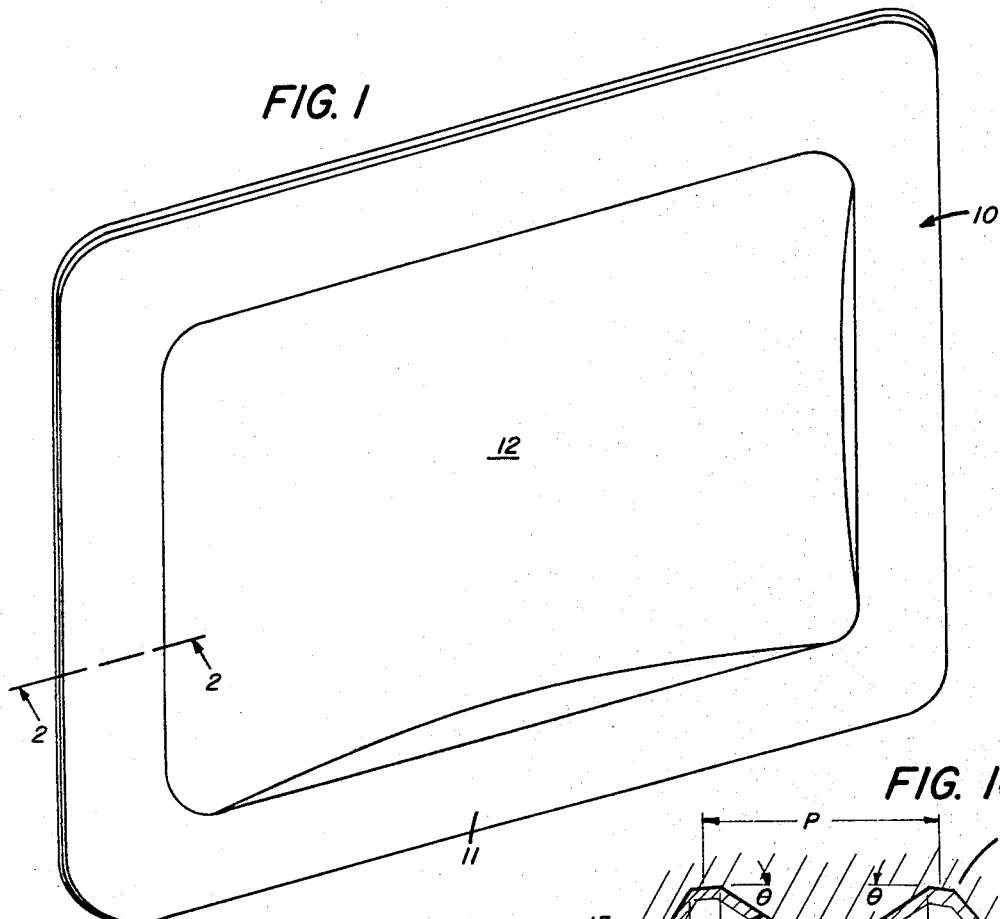
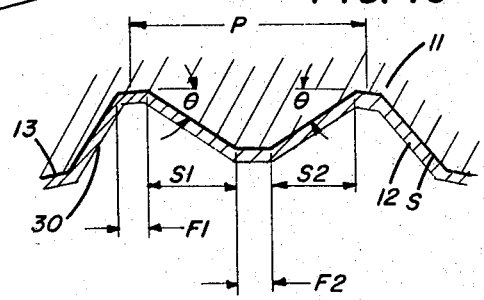
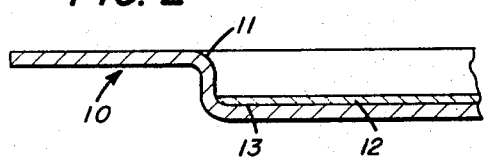
JASPER S. CHANDLER
JAMES J. DE PALMA
STANLEY B. SAUNDERS
INVENTORS
BY Lloyd F. Seebach
AGENT Oct. 29, 1968   J. S. CHANDLER ET AL   3,408,132
PROJECTION SCREEN
Filed Nov. 21, 1966   7 Sheets-Sheet 2

250 X

2500X

JASPER S. CHANDLER
JAMES J. DePALMA
STANLEY B. SAUNDERS
INVENTORS

BY

AGENT

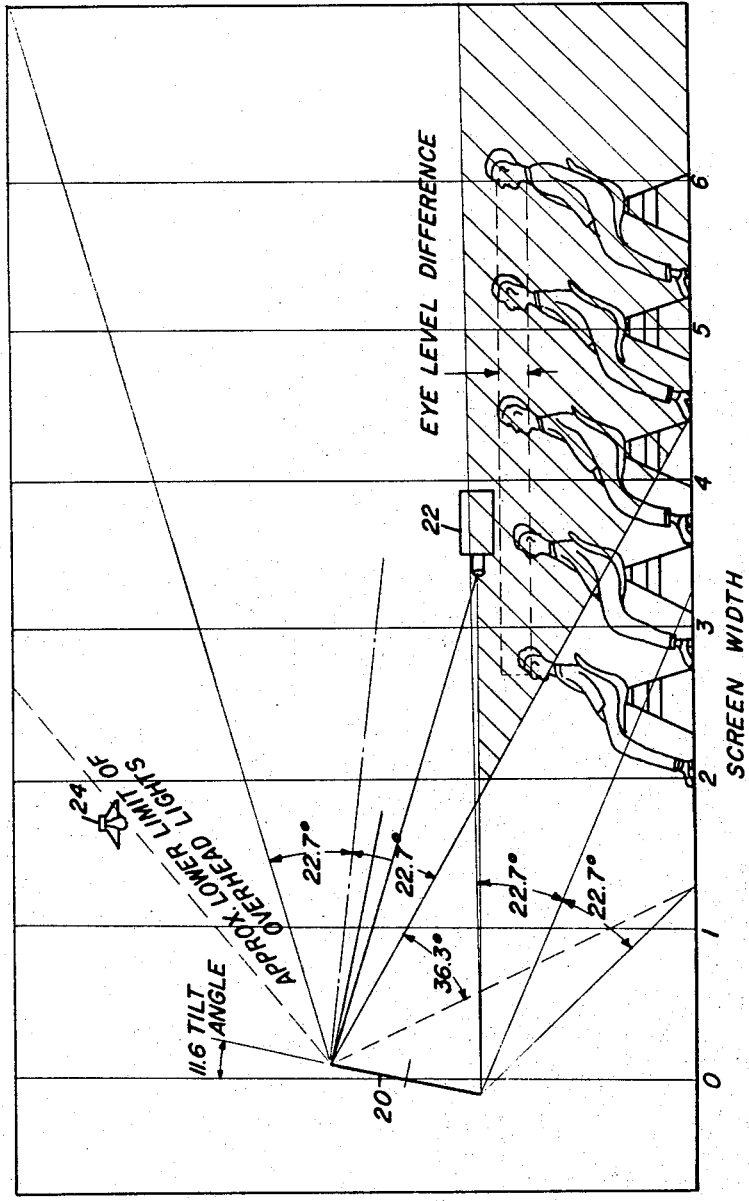

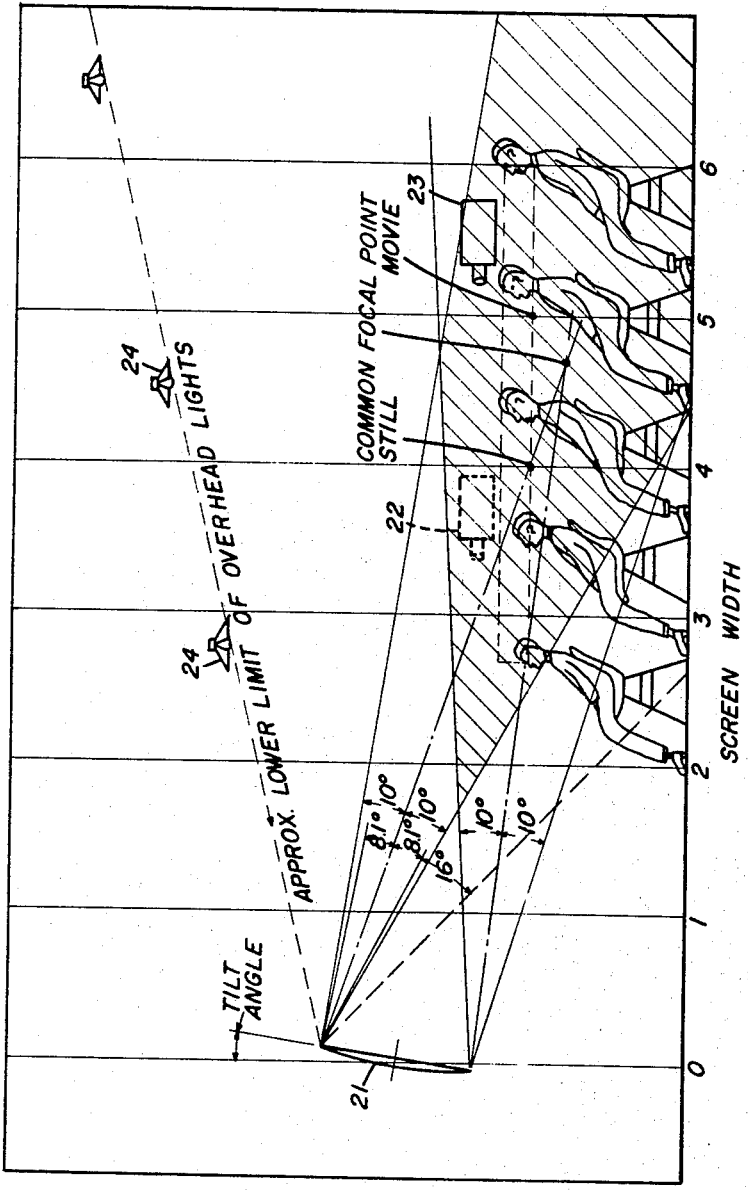

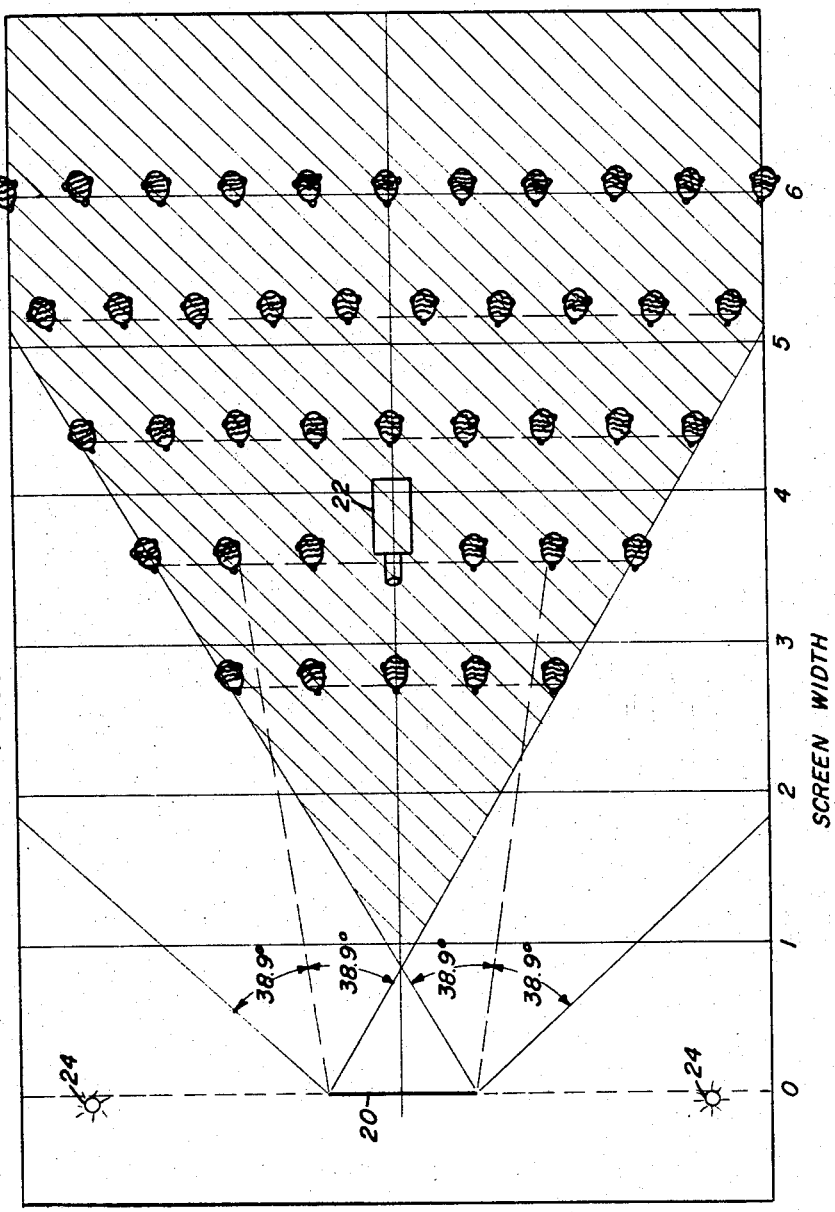

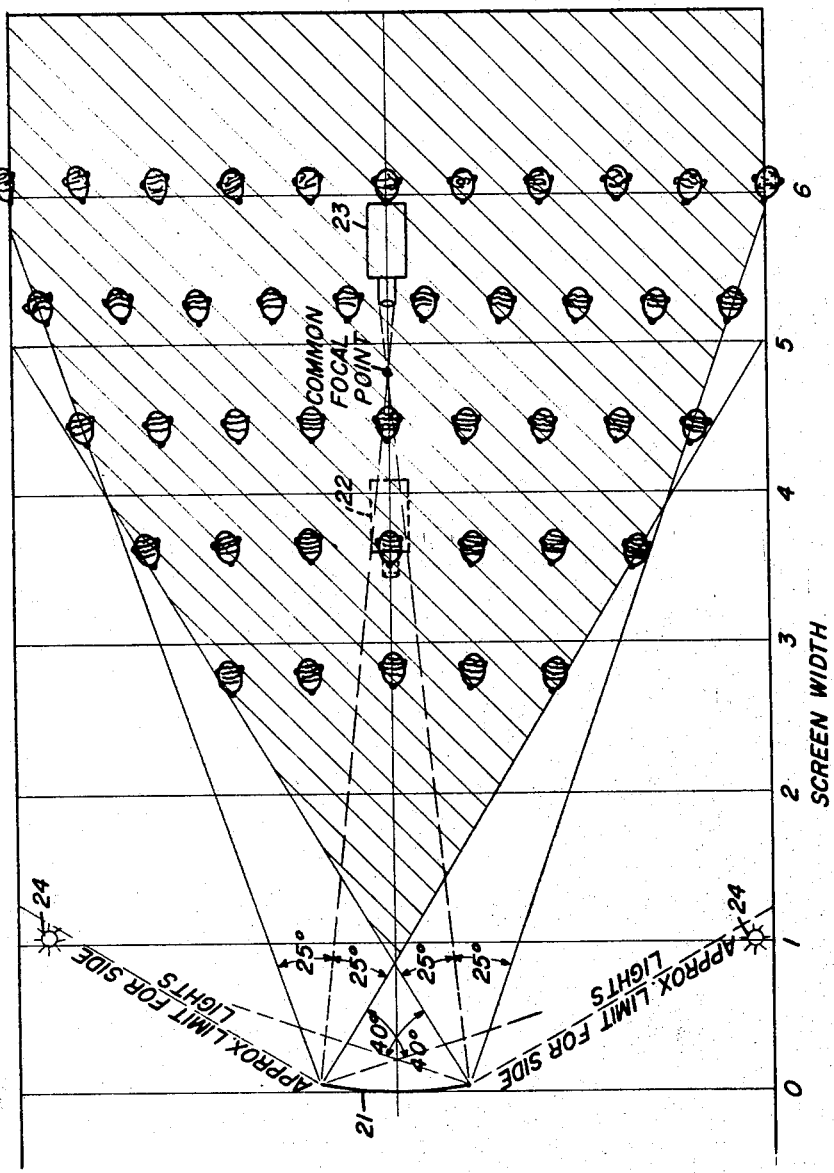

United States Patent Office 3,408,132
Patented Oct. 29, 1968

3,408,132
PROJECTION SCREEN
Jasper S. Chandler, James J. De Palma, and Stanley B. Saunders, Rochester, N.Y., assignors to Eastman Kodak Company, Rochester, N.Y., a corporation of New Jersey
Filed Nov. 21, 1966, Ser. No. 595,926
16 Claims. (Cl. 350—125)

The present invention relates to a projection screen and more particularly to a projection screen of the reflection type.

In the art of projection screens, many attempts have been made to produce a screen which has a high brightness factor. The most efficient type of known screen is capable of an increase in brightness over a matte screen by a factor of about two times for a reasonable audience accommodation. Further, the screens of the prior art have the particular disadvantage that the most efficient use of the screen has to be made in substantial darkness since the image contrast and color saturation are reduced considerably by use in ambient light.

The brightness of front projection screens has been increased by the use of various materials and treatment of the reflecting surface to provide a surface that will concentrate the light within narrower angles. Projection screens having such surfaces formed by glass or plastic beads, embossed or scored lenticulations, bubbles, etc., are well known and have been in use over an extended period of time. Attempts have also been made to increase the brightness factor by using one of the aforementioned surfaces in conjunction with a screen having an arcuate surface in at least one direction. However, the above combinations of materials and forms of screen supports have not produced a screen capable of being used with a projector having a low light output or in high ambient light without loss of contrast or color saturation.

A primary object of the present invention is to provide a front projection screen which has a greatly increased useful light reflectivity.

A further object of the invention is to provide a front projection screen that can be used under normal room light or actual daylight conditions.

Yet another object of the invention is to provide a front projection screen that can be used with projectors of low light output for providing a projected picture having significantly higher image brightness for home, classroom, theater or industrial use.

And still another object of the invention is to provide a front projection screen having a reflecting surface comprising randomly aligned and generally elongated irregularities or elements in the form of surface deformations which serve to provide a reflection surface having high reflecting efficiency, low effective absorption, high effective brightness gain, very small element size to reduce scintillation and eliminate any line and grain pattern, and controlled element shape, so that the screen produces a sharp cutoff of reflected light at the higher angles for rejection of ambient light.

These and other objects and advantages will be apparent to those skilled in the art from the detailed description of such a screen which follows.

The above objects and advantages of the invention have been attained by using the dull, relatively unsmooth side of a foil, for example, aluminum foil sheeting, for the reflecting surface of a screen. This material is appropriately applied to an arcuate support. The dull relatively unsmooth surface of such foil is obtained by the interaction of the facing surfaces of two sheets of the foil when they are compression rolled and separated. The facing surfaces of the sheets, after separation, are found to have randomly aligned and generally elongated irregularities which take the form of surface deformations that extend generally in a direction normal to the direction of movement of the sheet when being compression rolled. It has also been found that a surface having such irregularities can be obtained by the multiple strip compression rolling technique for organic polymers; this technique being disclosed in U.S. Patent 3,194,863. When a polymer material is used for a screen reflecting surface, the exposed surface, that is, the irregular surface, can be metalized and has been found to provide substantially the same brilliance and performance as that of a metallic foil. It is to be emphasized that the dull side of the screen material should be used as the reflecting surface. If the other or shiny surfaces of such sheets are used on an arcuate or curved surface, the effect is the same as that of a mirror whose light is directed back to a single focal point, resulting in a most unacceptable viewing screen.

The surface that is obtained by compression rolling at least two sheets or continuous webs of metal of any reasonable thickness with smooth rollers under high pressure of about 6,000–50,000 pounds per lineal inch and then separating or peeling the sheets or webs apart, produces a preferred directional reflectance of high efficiency. The elongated irregularities are randomly aligned to extend generally in a direction perpendicular to the rolling direction of the foil. Very small element size of the individual irregularities is obtained, for example, 1,000–3,000 per lineal inch compared to 10–40 per lineal inch which is prevalent in most commercial types of screens. Variations of brightness gain, element size and light distributions can be obtained by varying the material, the rolling pressure, the lubricants used in the interface between the rolled sheets or webs, and the peeling technique.

Reference is now made to the accompanying drawings in which like reference numerals designate like parts and wherein:

FIG. 1 is a perspective view of a curved projection screen embodying the invention;

FIG. 2 is a partial sectional view taken substantially along line 2—2 in FIG. 1;

FIG. 6 is a diagrammatic side view showing the vertical spread angle of a flat screen having a reflecting surface in accordance with the invention;

FIG. 7 is a diagrammatic side view showing the vertical spread angle of a curved screen having a reflecting surface in accordance with the invention;

FIG. 8 is a diagrammatic plan view showing the horizontal spread angle of the flat screen shown in FIG. 6;

FIG. 9 is a diagrammatic plan view showing the horizontal spread angle of the curved screen as shown in FIG. 7;

FIG. 10 is an enlarged sectional view of a screen support showing one embodiment of a rib pattern for increasing the spread angles of the screen.

With reference to FIG. 1, a screen 10 comprises a support member 11 and a metallic foil 12 secured to a surface 13 of the support member for reflecting light projected thereon to an audience. The support member 11 can be made of any material having sufficient rigidity to provide a stable curved surface. The support member 11 can be made of metal, fiber glass, polyvinyl chloride, or any one of many other plastic materials, and can be flat, curved in at least one direction or, preferably, provided with a paraboloid, spherical, elipsoidal, etc. surface.

Figure 3:
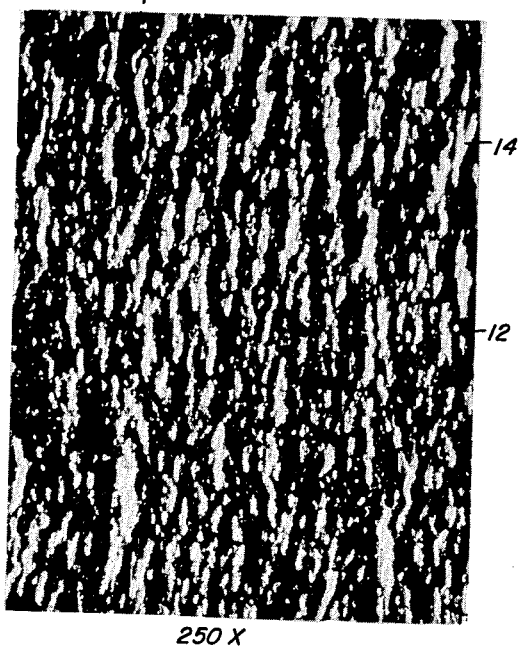
FIG. 3 is a photomicrograph of the light-reflecting surface of a metallic foil having elongated irregularities according to the invention.
Figure 4:
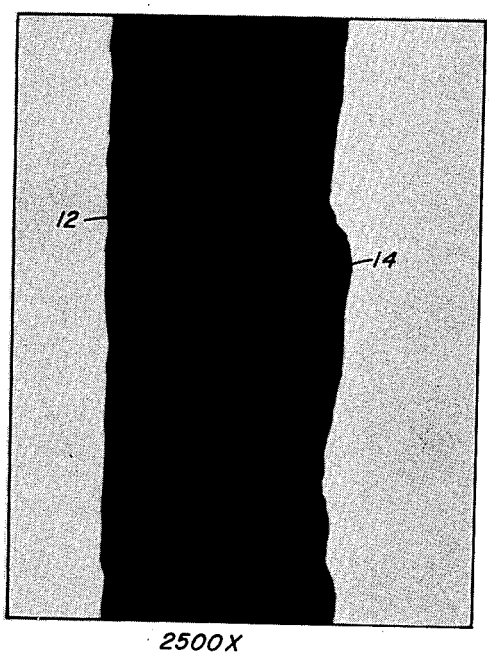
FIG. 4 is a photomicrograph of a vertical section through the metallic foil shown in FIG. 3.

The metallic foil 12 is secured to and against the surface 13 of support member 11 by an adhesive, or other suitable means, with the dull side of the foil exposed for projection use and with the foil oriented on the support such that the direction of compression rolling of the foil becomes the horizontal direction on the finished screen. In other words, the elongated irregularities 14, as seen in FIG. 3, extend in a substantially vertical direction relative to the screen. The radius of the surface 13 can be about 4½ times the screen width for the projection of either still or motion pictures. The precise shape of the arcuate surface 13 is not critical except for very narrow audience spaces. A different radius can also be chosen for the curvature in each of the horizontal and vertical directions, thereby resulting in a toroidal surface.

As indicated above, the terms "horizontal" and "vertical" refer to relative orientations with respect to the screen surface, which is assumed for convenience to be mounted substantially vertically for viewing by a usual audience distribution extending more horizontally than vertically. Thus, by way of example, the screen is described with respect to its preferred usage.

Figure 5:
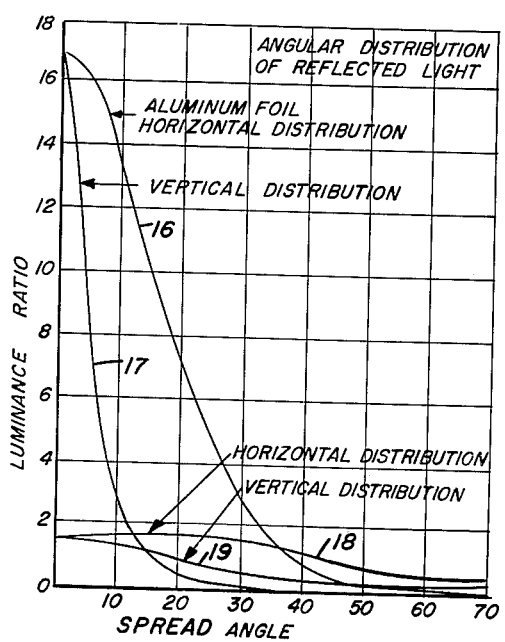
FIG. 5 is a graph showing the angular distribution of reflected light by a screen in accordance with the invention as compared with one screen material of a commercially-available type.

With reference to FIG. 5, the luminance ratio, or brightness gain, is defined as the ratio of the luminance of a screen material relative to that of a perfect diffuser. Curve 16 represents the horizontal light distribution and curve 17 represents the vertical distribution for a doubly-curved screen having a reflecting surface in accordance with the invention. The luminance or brightness gain of our improved screen is seen to be about 17 on axis for a material having a reflecting surface comprising the irregularities 14, as seen in FIG. 3, and falls off sharply with the increase in spread angle especially in the vertical direction. The average gain is about ten within the useful viewing angles and the sharp cutoff with the spread angle together with greatly reduced luminance ratio at the higher viewing angles are extremely effective for the rejection of ambient light.

Superimposed on the curves for the screen of the invention are curves 18 and 19 which are representative of the horizontal and vertical distribution, respectively, of the luminance of one of the best commercially available screens of which we are aware, having an average brightness gain of less than two. It can be readily appreciated from this comparison of two such screens that the average brightness of a screen in accordance with the invention for the preferred audience angles is many times that of the best commercially available screen, and that high levels of ambient light are rejected.

This invention makes use of the fact that the screen brightness is increased for an efficient reflecting material as the angle through which the light is spread decreases. However, the reduced spread angle also reduces the size of the audience space. A screen having such increased brightness comprises, preferably, a support having a doubly curved surface on which a foil is secured, such that the dull surface of the foil having the elongated irregularities is exposed for reflecting projected images.

With reference to FIGS. 6–9, it is shown how an assumed audience can be supplied with light reflected from a conventional flat screen 20 tilted at an angle of 11.6° and a curve screen in accordance with the invention tilted at an angle of 9.3° for motion pictures and at an angle of 10.8° for still pictures, the light being supplied by a still projector 22 that has its lens positioned about 11½ feet from a 40-inch screen and a movie projector 23 that has its lens positioned about 17½ feet from a screen of the same size. In each case, the dot-dash lines show the direction of light reflection assuming that the screen surface were 100% specular as for a true mirror. The spread angle is measured relative to this line. By comparing FIGS. 6 and 7, it can be seen that with the screen 21 curved in a vertical sense, a spread angle of ±10° serves the same purpose of full light coverage as is provided by a spread angle of ±22.7° for the flat screen 20. The curved screen 21 will therefore provide the brighter image. In the same FIGS. 6 and 7, it will also be noted that the curved screen 21 allows overhead ambient lights 24 to be placed much lower while still affording the same degree of protection to the audience from any unwanted light.

FIGS. 8 and 9 compare the curved and flat screen configurations in plan view. With the screen 21 curved in a horizontal sense a smaller spread angle is required and therefore a brighter view. In this case a spread angle of ±25° for the curved screen supplies the same audience space as the flat screen 20 which has a spread angle of ±38.9°. The rejection of ambient light is also better for the curved screen 21.

As noted above, the radius of curvature of the screen 21 is disclosed as being approximately 4½ times the screen width for either still or movie projection. In practice, the radius of curvature is not critical except for very narrow audience spaces. In any special case of audience size, viewing distance and/or projection distance, a screen size and screen curvature can be worked out to utilize the reflected light and reject the ambient light to the best advantage. Ambient light reaching the audience causes reduction of contrast, degradation of color saturation, glare, etc. By curving the screen and with screen material of properly controlled reflection properties the rejection of ambient light is enhanced because (1) the increased brightness reduces the relative effectiveness of the ambient light, and (2) the reduced spread angles that are permitted by double curving the screen allow ambient light to originate from zones closer to the axis of the projector without reaching the audience than is permitted by conventional screens. Further, conventional screens not only require greater spread angles which accept greater zones of ambient light, but do not cut off sharply at the required angles, as shown in FIG. 5.

For the spread angles shown in FIGS. 6–9, it can be computed from the laws of optics and on the assumption that no light is absorbed by or transmitted through the screen, that the brightness as seen by all members of the audience as compared to a perfect diffuser that appears equally bright throughout the entire spread angle of ±90° is as follows: (1) for a flat screen in both horizontal and vertical sense (spread angles of 22.7° and 38.9°), the theoretical relative brightness is 3.5; (2) for a screen curved in the vertical sense and flat in the horizontal sense (10° and 38.9°), the theoretical relative brightness is 7.75; and (3) for a screen curved in both the vertical and horizontal sense (10° and 25°), the theoretical relative brightness is 11.0. Thus, it is seen that for an assumed audience, as shown in FIGS. 6–9, the improvement in curving in the vertical sense only is in the ratio of 7.75/3.5=2.2 and for curving in both directions the improvement ratio is 11.03/3.5=3.1. Consequently, a theoretically perfect flat screen can only show an improvement of less than a factor of 2 over the best commercially available screen, whereas a theoretically perfect doubly curved screen shows an improvement of over a factor of 5. It can also be shown that for practical screen materials which do not, in general, exhibit equal brightness within the usable spread angles, the image on the screen will always appear of uniform brightness from side to side and from top to bottom if viewed from approximately the focal distance of a double curved screen. This essentially includes all of the audience except those in the extreme front or back. For a flat screen, using practical screen materials, the nonuniformity often results in objectionable dropoff of brightness or a "hot spot" type of view.

For an ideal reflection distribution of the light incident on a screen material, it would be desirable to have a constant luminance ratio which would extend to the desired cut off angles and then drop sharply to zero luminance. For example a no-loss ideal material for coverage angles having ±10° in a vertical sense and ±25° in a horizontal sense would have a luminance ratio of 11.0 within these angles and zero beyond these angles. Certain aluminum foil materials which have been considered as being acceptable for projection screens might, for example, have a luminance ratio of 16.0 at 0° and then fall off to approximately 4.0 at the spread angles of ±8° vertical and ±25° horizontal. While such materials provide an average ratio of approximately 10.0 and, owing to the double curvature of the screen support do not give rise to "hot spots" or nonuniform illumination of any part of the screen for any one observer, anyone near the side of the audience space may see a darker picture and note poorer contrast and color purity in the presence of strong ambient lights. The luminance ratio curve for available materials does not drop off as sharply as is desirable at the limiting angles. The light represented in the "tail" sections of the curves (at higher viewer angles) is unused and represents a loss of efficiency, but perhaps even more important is the fact that this unused light allows ambient light from wider angles to be reflected by the screen to some observers. The optimum contrast would be obtained with a luminance ratio curve having a flat top and a sharper cutoff.

It has been determined that a flat top and sharper cut-off of the luminance ratio can be obtained by the use of lower spread angles of the basic material combined with a suitable rib pattern on the curved surface of the support. Such a rib pattern is not a true "lenticular pattern" because the rib pattern does not present any curved surfaces to the light incident thereon. A "lenticular pattern" may be used but is not required. Such a rib pattern is shown in FIG. 10. It has been determined that the combination of four planar surfaces, as shown in FIG. 10, provides a luminance ratio that more nearly approaches the optimum condition. Referring to FIG. 10, the rib pattern comprises vertically extending and continuous grooves or striae 30 comprising bottom surface F1 and diverging side surfaces S of a length designated by S1 and S2, the divergence being from top to bottom. The surfaces S make an angle θ with the surface F1. The grooves 30 are spaced so as to provide spaced lands F2. Such a pattern of ribs or grooves 30 can be provided on the double curved support material 13 by forming the surface 13 against a male master and then cementing the aluminum foil 12 to the support. The surfaces F1 and F2 are actually vertical strips of the spherical surface 13 rather than planar surfaces. The angle θ is measured relative to the plane tangent to the spherical surface defined by either surfaces F1 or F2 at any point. In practice either surface F1 or F2 may be reduced to zero so long as the correct total spherical area is provided.

The value of P, which is the effective pitch between adjacent grooves, should not be larger than approximately 1/1000 times the screen width in order that the rib pattern is essentially unnoticable at a normal viewing distance; for example, with a 20" screen, $P = 1/50$" which is equal to .020", and for a 30" screen P would have a maximum dimension of .030".

Figure 11:
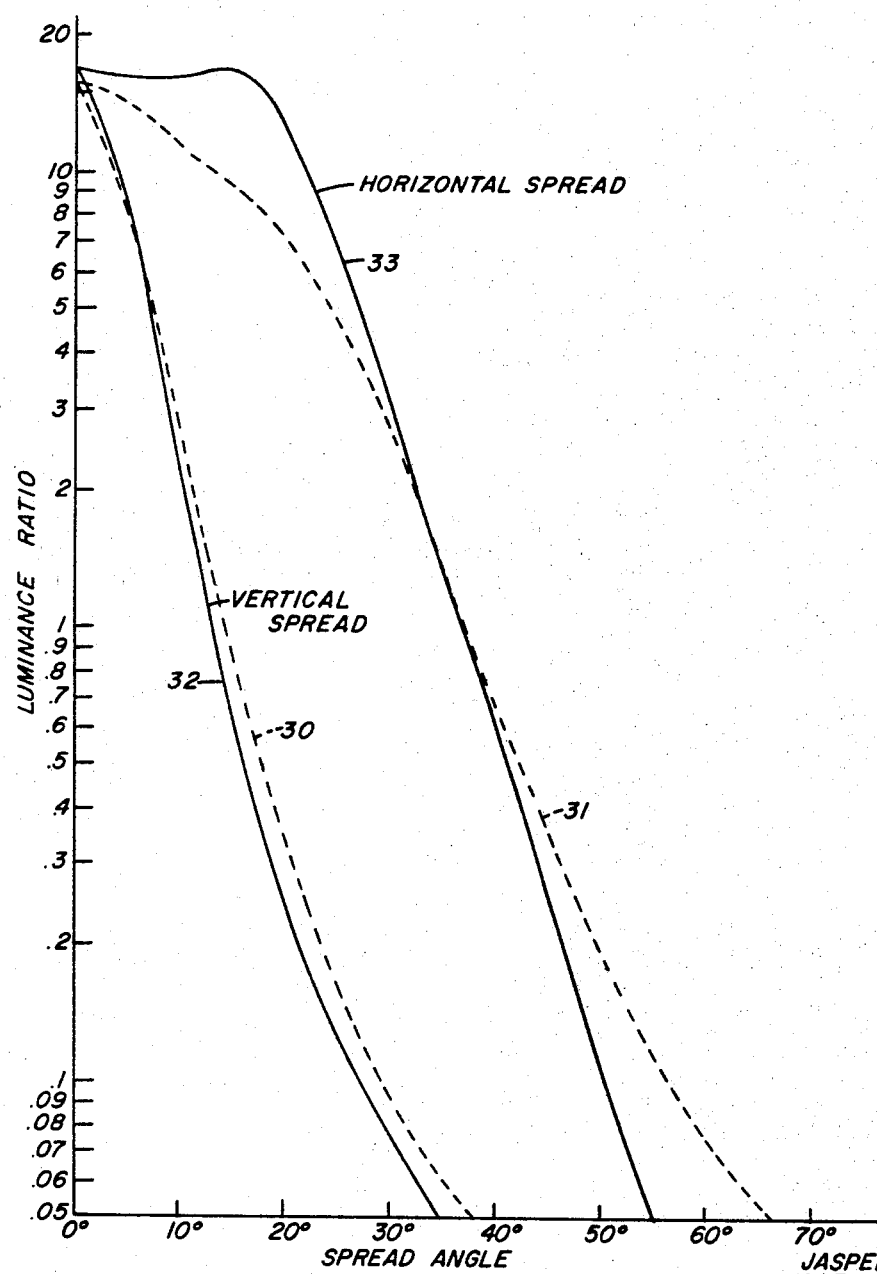
FIG. 11 is a graphical comparison of the cut-off and the spread angles for a nonribbed and ribbed doubly curved screen in accordance with the invention.

In FIG. 11 the dotted line curves 30 and 31 show the luminance ratio for various horizontal and vertical spread angles, respectively, for a double curved screen having a reflecting surface in accordance with the invention and with no rib pattern. The full line curves 32 and 33 show the horizontal and vertical spread angles, respectively when an aluminum foil having a narrower spread angle is used as a reflecting surface on a doubly curved screen support having a rib structure as shown in FIG. 10. It will be noted that the horizontal spread maintains an essentially constant luminance ratio of approximately 16.0 to an angle of ±17°, and is about 40% of maximum value at ±25°; the luminance ratio exhibits a sharp cut-off at larger angles. For different screen sizes and audience spaces, it may be desirable to increase the spread angle, which can be accomplished by changing the shape of the grooves and/or lands comprising the rib pattern.

The brightness factor of a front projection screen is significantly increased by using a material having a surface provided with randomly aligned and generally elongated irregularities which concentrates the light at high efficiency within preferred angles as described above. Such an increase in screen brightness together with the rejection of ambient light permits projection of still and motion pictures under high ambient light conditions which heretofore has been impossible with any type of commercially available projection screen.

The invention has been described in detail with particular reference to a preferred embodiment thereof, but it will be understood that variations and modifications can be effected within the spirit and scope of the invention as described hereinabove and as defined in the appended claims.

We claim:
1. A projection screen comprising:
    a member having a reflecting surface provided with generally elongated irregularities formed by the interaction of the facing surfaces of at least two such members when compression rolled and separated, said irregularities extending in a generally vertical direction for providing preferred directional reflectance of any light incident on said reflecting surface.

2. A front projection screen comprising:
    a support member; and
    a thin sheet having a reflective front surface and having a rear surface secured to one surface of said support member;
    the front reflective surface of said sheet having generally elongated irregularities formed by the interaction of the facing surfaces of a least two such sheets when compression rolled and separated, said irregularities extending in a generally vertical direction for providing preferred directional reflectance of any light incident on said sheet.

3. A front projection screen comprising:
    a support member having a concavely curved surface; and
    a sheet having a reflective front surface and having a rear surface secured to and against said current surface of said support member;
    the reflective front surface of said sheet having generally elongated irregularities formed by the interaction of the facing surfaces of at least two such sheets when compression rolled and separated, said irregularities extending in a generally vertical direction for concentrating reflections of light projected on said sheet within a desired viewing area.

4. A projection screen in accordance with claim 3 wherein said curved surface of said support member is curved in both a horizontal direction and a vertical direction.

5. A projection screen in accordance with claim 3 wherein the said curved surface of said support member is curved generally spherically.

6. A projection screen in accordance with claim 3 wherein said irregularities are present in the order of 1000–3000 per lineal inch in a horizontal direction.

7. A projection screen in accordance with claim 3 wherein the radius of curvature of said curved surface of said support member is about 4½ times the width of said reflective front surface of said sheet.

8. A projection screen in accordance with claim 3 wherein said sheet is a metallic foil.

9. A projection screen in accordance with claim 3 wherein said sheet is an aluminum foil.

10. A projection screen in accordance with claim 3 wherein said sheet is a polymeric material having the front surface thereof metalized.

11. A projection screen in accordance with claim 3 wherein said curved surface of said support member is provided with spaced, generally parallel and vertically continuous lands formed by striae having diverging side surfaces.

12. A projection screen in accordance with claim 11 wherein the pitch of said striae is not greater than approximately $\frac{1}{1000}$ times the width of said screen.

13. A projection screen in accordance with claim 11 wherein said striae and the lands formed by said striae have a generally trapezoidal cross section.

14. The method of making a front projection screen which includes the steps of:
compressively rolling two thin sheets of reflective deformable material in facing relationship with one another, whereby the facing surfaces of the two sheets are deformed to define generally elongated closely spaced irregularities extending generally in one direction;
separating said two thin sheets; and
mounting one of said sheets on a support surface with the surface of the sheet defining the elongated surface irregularities exposed for projection use and with the elongated irregularities oriented in a generally vertical direction.

15. A front projection screen comprising:
a support member having a concavely curved surface; and
a sheet of aluminum having a reflective front surface and having a rear surface secured to said curved surface of said support member, said reflective front surface having noncontinuous elongated irregular grooves and ridges extending in a generally vertical direction, said grooves and ridges being present in the order of 1000 to 3000 per lineal inch horizontally.

16. A front projection screen comprising:
a support member having a concavely curved surface; and
a sheet having an aluminized reflective front surface and having a rear surface secured to said curved surface of said support member, said reflective front surface having noncontinuous elongated irregular grooves and ridges extending in a generally vertical direction, said grooves and ridges being present in the order of 1000 to 3000 per lineal inch horizontally.

References Cited

UNITED STATES PATENTS

| | | | |
|---|---|---|---|
| 1,288,867 | 2/1915 | Genter | 350—129 |
| 1,330,447 | 2/1920 | Pech | 350—125 |
| 1,498,433 | 6/1924 | Bouin | 350—129 |
| 1,526,715 | 2/1925 | Moon et al. | 350—125 |
| 1,568,023 | 12/1925 | McManus et al. | 350—129 |
| 2,177,572 | 10/1939 | Kogel. | |
| 2,256,692 | 9/1941 | Stableford | 350—129 |
| 2,508,058 | 5/1950 | Bradley. | |
| 2,928,131 | 3/1960 | Mahler. | |
| 3,314,742 | 4/1967 | Morgan | 350—117 |

FOREIGN PATENTS 1,369,446   7/1964   France.

JULIA E. COINER, *Primary Examiner.*